ns Patent [19]

Higuchi et al.

[11] Patent Number: 4,945,372
[45] Date of Patent: Jul. 31, 1990

[54] CAMERA

[75] Inventors: Tatsuji Higuchi, Akigawa; Kazuo Yamamoto, Yokohama; Hitoshi Shirai, Sagamihara; Yasuo Yamazaki, Hino; Yuichi Torikoshi, Shiroyama; Kazuyuki Iwasa; Toshifumi Nakano, both of Hachioji, all of Japan

[73] Assignee: Olympus Optical Co., Ltd., Tokyo, Japan

[21] Appl. No.: 307,367

[22] Filed: Feb. 6, 1989

[30] Foreign Application Priority Data

Feb. 16, 1988 [JP] Japan ................................. 63-33028
Feb. 16, 1988 [JP] Japan ................................. 63-33029

[51] Int. Cl.⁵ .............................................. G03B 3/00
[52] U.S. Cl. ................................... 354/199; 354/221; 354/222; 354/149.1; 354/288; 354/402
[58] Field of Search ...................... 354/195.1, 199, 221, 354/222, 149.1, 149.11, 288, 402, 200, 201

[56] References Cited

U.S. PATENT DOCUMENTS 2,157,547  5/1939  Leitz ..................................... 354/222
4,609,269  9/1986  Kamata ............................ 354/149.11

FOREIGN PATENT DOCUMENTS 138242   6/1986  Japan ................................. 354/149.1
63-2030  1/1988  Japan .
63-6532  1/1988  Japan .

Primary Examiner—Brian W. Brown
Attorney, Agent, or Firm—Frishauf, Holtz, Goodman & Woodward

[57] ABSTRACT

A camera includes a photographic optical system movable along its optical axis, and a cam ring rotatable about the optical axis of the optical system. When it is rotated by a motor, the cam ring moves the optical system to change the focal length thereof. Arranged at the outside of the cam ring are a viewfinder optical system, whose optical axis is parallel to that of the photographic optical system, and a strobe mechanism movable in a direction parallel to the optical axis of the photographic optical system. First and second cam portions are arranged on the cam ring and engage the viewfinder optical system and strobe mechanism, respectively, so as to move them along the optical axis of the photographic optical system, in association with the rotation of the cam ring.

14 Claims, 8 Drawing Sheets

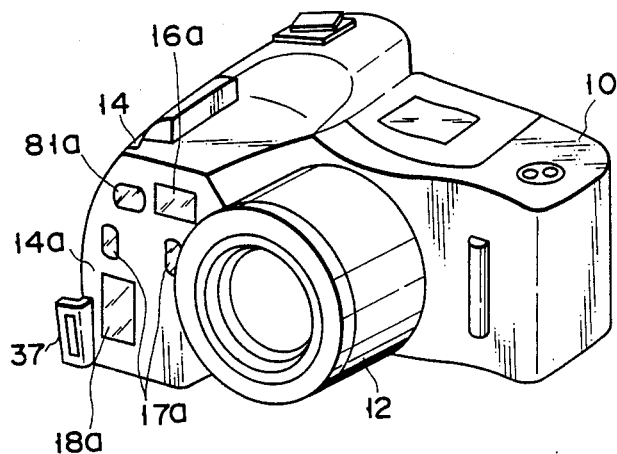
F I G. 1
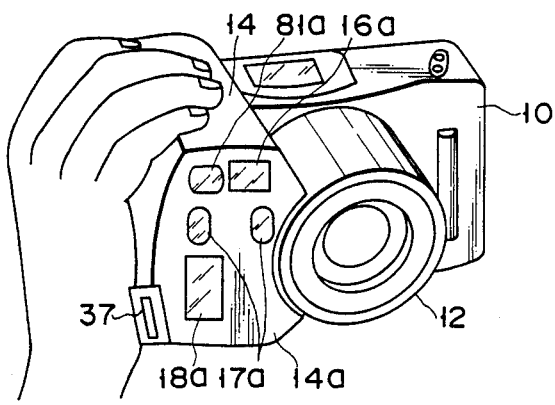
F I G. 2

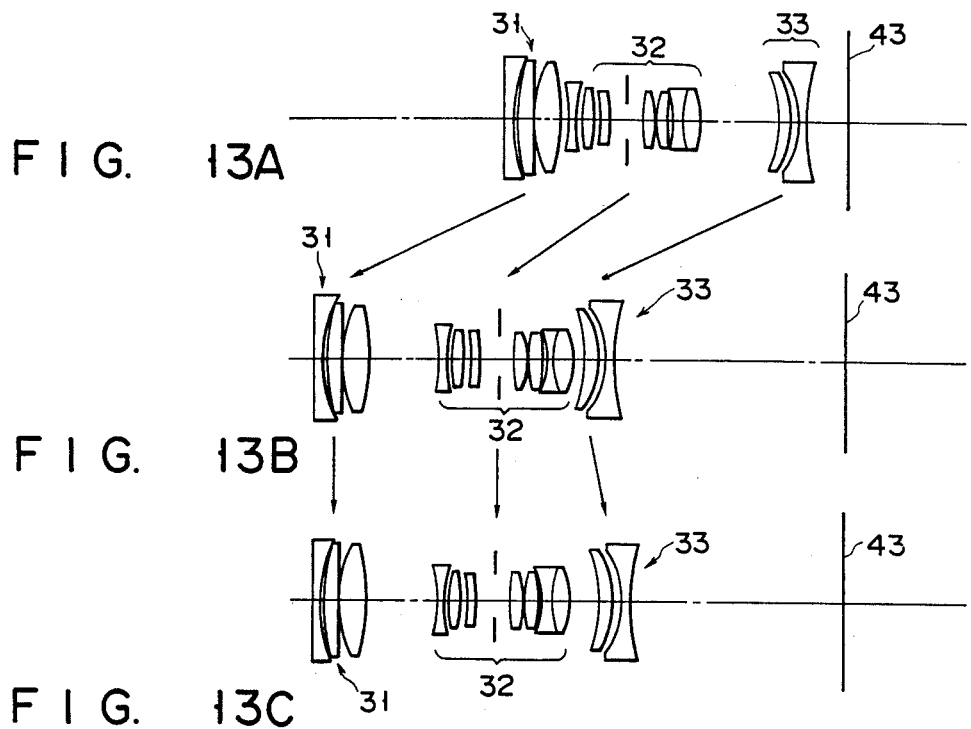
FIG. 13A
FIG. 13B
FIG. 13C
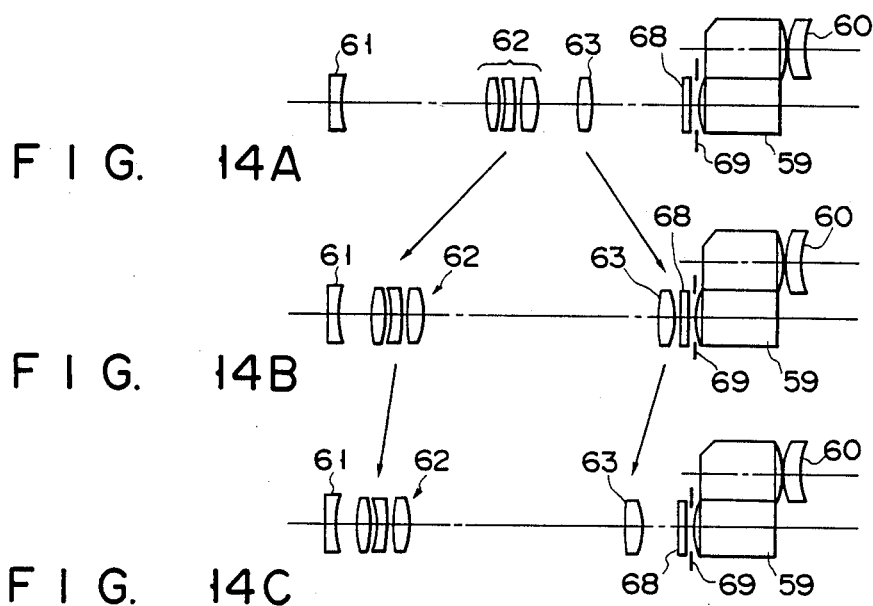
FIG. 14A
FIG. 14B
FIG. 14C

CAMERA

BACKGROUND OF THE INVENTION

1. Field of the Invention

The present invention relates to a camera, and more particularly, to a lens-shutter camera having a zoom lens.

2. Description of the Related Art

Cameras with long-focus zoom lenses have come into wide spread use in recent years. In general, in cameras of this type, a cam ring of a lens barrel, which supports a photographic optical system therein, is rotated by means of a motor, thereby moving or zooming the optical system. If the focal length of the optical system becomes longer, it becomes necessary to use a large-sized viewfinder mechanism and strobe mechanism, and also to move the strobe mechanism and an optical system of the viewfinder mechanism in synchronism with the zooming of the photographic optical system.

Conventionally, therefore, a motor and a cam member for the drive of the viewfinder mechanism and the strobe mechanism are provided separately from the motor for the drive of the cam ring. With tis arrangement, the viewfinder optical system and the strobe mechanism can be moved in synchronism with the zooming of the photographic optical system.

If an additional motor and a cam member are used in addition to the motor for the cam ring, however, the number of components making up the camera will inevitably increase, and resulting in a camera of complicated construction. Accordingly, higher manufacturing costs are entailed, and miniaturization of the camera cannot be effected. In accurately synchronizing the operations of the viewfinder optical system and the strobe mechanism with the zooming of the photographic optical system, moreover, it is difficult to control the two motors, and adjusting means is required for the synchronization. Thus, the construction of the camera becomes more complicated, the manufacturing costs rise, and the reliability of the operation of the camera is not high enough.

SUMMARY OF THE INVENTION

The present invention has been developed in consideration of the above-described circumstances, and has as its object to provide a compact camera having a simple arrangement which ensures that the viewfinder optical system and the strobe mechanism thereof are always moved in synchronism with the zooming of the camera's photographic optical system.

In order to achieve the above object, according to a camera of the present invention, a viewfinder optical system and a strobe mechanism are arranged beside a cam ring so that they are moved directly in association with the rotation of the cam ring, by means of first and second cam portions on the outer circumferential surface of the cam ring.

With this arrangement, only one motor is required as a drive source for rotating the cam ring, and thus a cam member does not have to be provided between the motor and the viewfinder optical system or the strobe mechanism. As a result, the number of components making up the camera can be reduced, so that the construction is simplified, and the manufacturing costs lowered. Moreover, since the viewfinder optical system and the strobe mechanism are controlled directly by means of the cam ring, their operation can be accurately synchronized with the rotation of the cam ring—i.e. with the zooming of the photographic optical system—thus resulting in a camera of improved operating reliability.

BRIEF DESCRIPTION OF THE DRAWINGS

FIGS. 1 to 14 show a zoom-lens camera according to an embodiment of the present invention, in which FIG. 1 is a perspective view of the camera;

FIG. 2 is a perspective view of the camera from a different direction,

FIG. 3 is an exploded perspective view showing the internal construction of the camera, FIGS. 4, 5 and 6 are, respectively, a plan view, a side view, and a front view, schematically illustrating the arrangement of components making up the camera;

FIG. 7 is a sectional view of a lens barrel;

FIGS. 8 and 9 are, respectively, a plan view and a bottom view, schematically illustrating the lens barrel;

FIG. 10 is a perspective view of a poly-prism;

FIG. 11 is a perspective view of an interlocking plate;

FIG. 12 is a front view of a parallax correction mechanism;

FIGS. 13A, 13B, and 13C are schematic views showing different operating modes of a photographic optical system, and FIGS. 14A, 14B, and 14C are schematic views showing different operating modes of a viewfinder optical system.

DETAILED DESCRIPTION OF THE PREFERRED EMBODIMENTS

Figure 3:
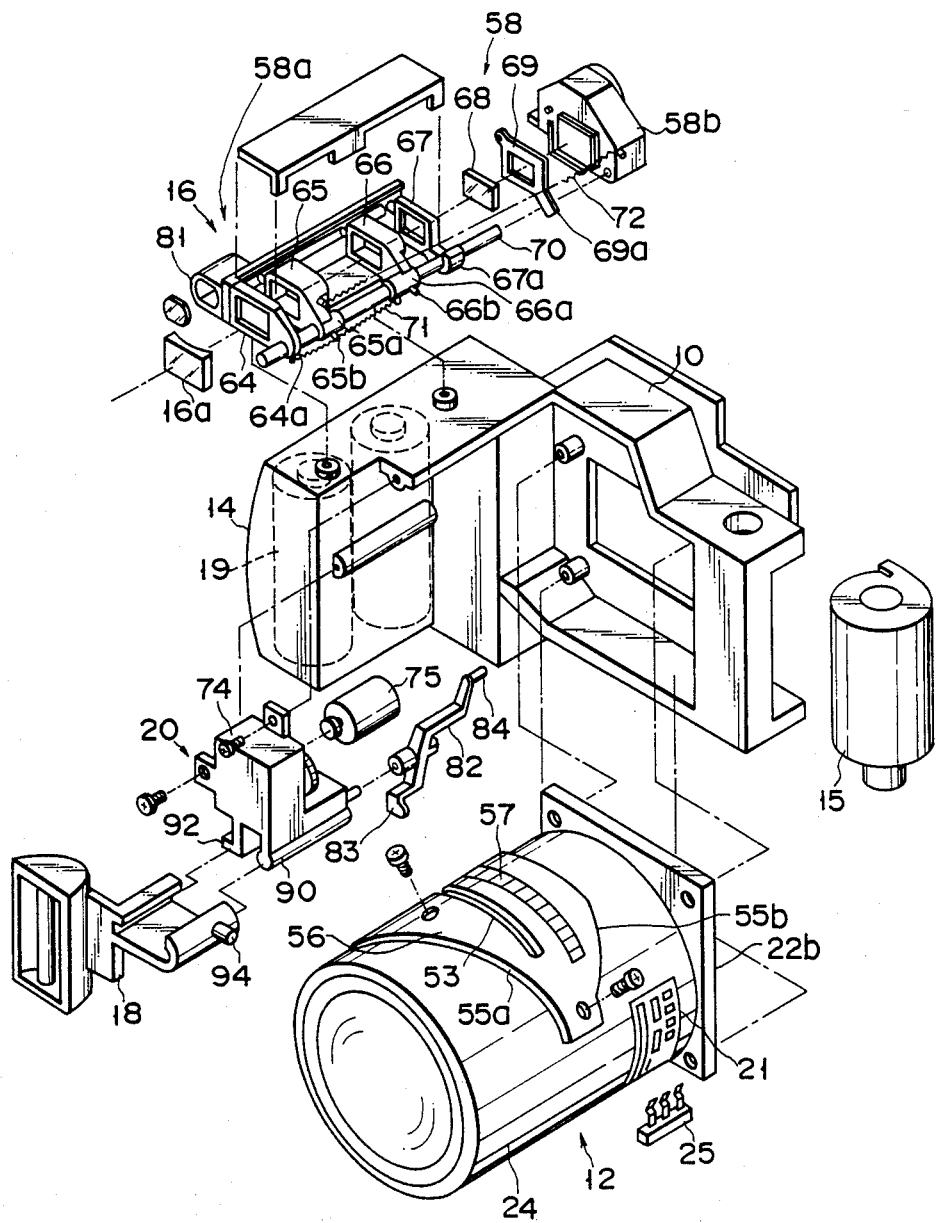
Figure 4:
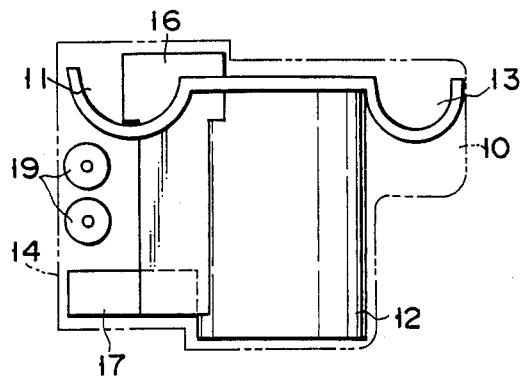
Figures 5, 6:
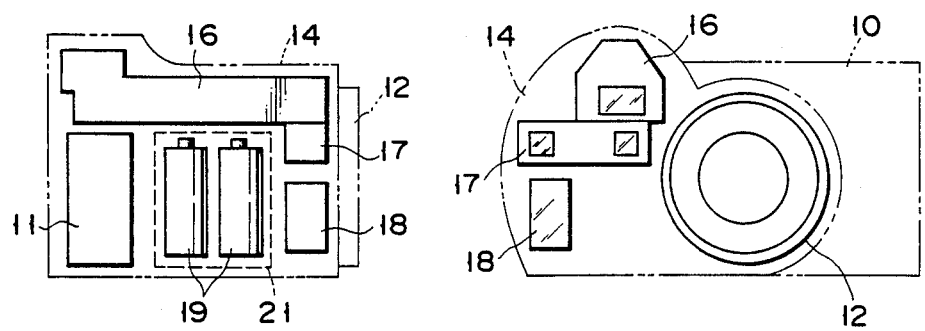

An embodiment of the present invention will now be described in detail, with reference to the accompanying drawings.

FIGS. 1 and 2 show an embodiment of the present invention as applied to a camera having a zoom lens with a focal length of 100 mm or thereabout. This camera comprises horizontally elongated, substantially rectangular body 10 and lens barrel 12 which protrudes forward from substantially the central portion of the front of the body. Grip section 14 is situated to the left of lens barrel 12 so as to be continuous therewith, protruding forward from body 10 and extending parallel to the axis of lens barrel 12. Front end face 14a of grip section 14 extends at right angles to the axis of lens barrel 12, and, as can be seen in FIG. 2, section 14 itself forms a horizontal grip on which an operator's fingers can be placed side by side along the axis of lens barrel 12.

As is shown in Figs. 1 to 6, cartridge compartment 13, in which a film cartridge is loaded, and film compartment 11 are both defined inside body 10. Grip section 14 houses viewfinder mechanism 16, autofocus optical system (hereinafter referred to as AF optical system) 17, timer display 81 doubling a an luminescent portion for automatic focusing, battery compartment 21 containing batteries 19, strobe mechanism 18, and zoom drive mechanism 20. Mechanism 20 serves to zoom the photographic optical system and an optical system of viewfinder mechanism 16, and to adjust the position of strobe mechanism 18.

The relative positions of the aforementioned components will now be described. Viewfinder mechanism 16 is housed inside the upper portion of grip section 14, and extends parallel to lens barrel 12. The proximal end portion of mechanism 16 is situated over timer display 81. AF optical system 17 and timer display 81 are housed in grip section 14 such that they are situated below and to the left of the front end portion of mechanism 16, respectively. Strobe mechanism 18 and drive mechanism 20 are situated below viewfinder mechanism 16 and AF optical system 17, while battery compartment 21 is situated between the strobe mechanism and film compartment 11. Objective lens 16a of viewfinder mechanism 16, display window 81a of timer display 81, a pair of objective lenses 17a of AF optical system 17, and flash window 18a of strobe mechanism 18 are exposed on front end face 14a of grip section 14.

The relative positions of these components have been determined on the basis of the following requirements:

(1) That the viewfinder mechanism must not be situated below the film compartment;

(2) that in order to eliminate parallax between the optical system of the viewfinder mechanism and the photographic optical system in the lens barrel, the viewfinder mechanism should be situated as close to the lens barrel as possible;

(3) that in order to eliminate parallax between an autofocus target mark of the viewfinder mechanism and the AF optical system, the AF optical system should be situated as close to the viewfinder optical system as possible; and (4) that in order to prevent the occurrence the so-called "red eye" phenomenon, the strobe mechanism should be situated as far away from the optical axis of the photographic optical system as possible.

Referring to Figs. 1 and 2, numeral 37 designates a strap lug which protrudes sideways from front end face 14a of grip section 14. When the operator holds the grip section, the lower part of his/her hand normally comes in contact with strap lug 37, thereby preventing the operator from losing his/her grip on the camera.

In the camera constructed in this manner, viewfinder mechanism 16, AF optical system 17, timer display 81, strobe mechanism 18, battery compartment 21, and zoom drive mechanism 20 are all arranged together, beside lens barrel 12. These components, in effect, constitute grip section 14 of the camera. Even though the length of lens barrel 12 increases as the focal length of the photographic optical system increases, therefore, the space beside the lens barrel can be effectively utilized for housing the above components of the camera. Thus, the horizontal dimensions and height of the camera can be minimized, and the camera made compact as a whole. Moreover, as was mentioned earlier, grip section 14 forms a horizontal grip on which the operator's fingers are placed side by side along the axis of lens barrel 12. Therefore, although it is continuous with the lens barrel, the grip section can provide an optimum configuration for the grip of a longfocus camera.

Furthermore, since the components of the camera are arranged utilizing the space beside lens barrel 12, requirements (1) to (4) are therefore easily satisfied. Thus, the camera can fulfill its desired function.

The following is a detailed description of the arrangement of the individual components making up the camera.

Figure 7:
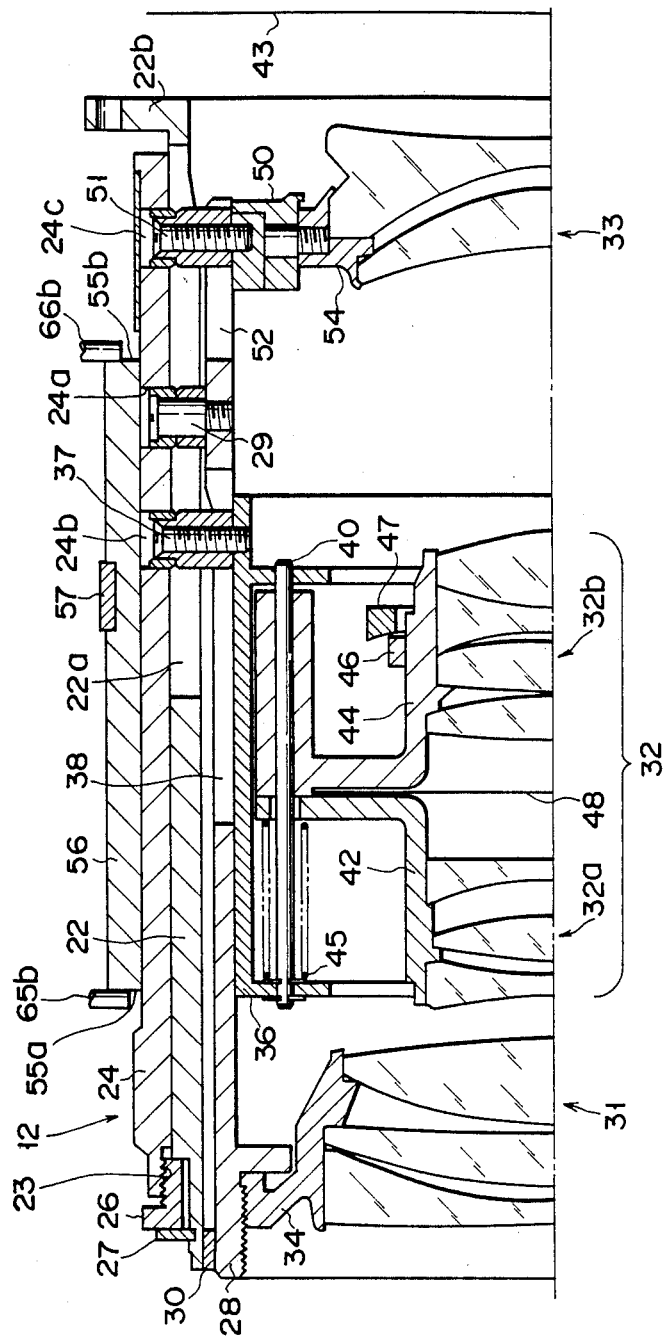

As is shown in FIG. 7, lens barrel 12 has cylindrical fixed frame 22, on the outer circumferential surface of which cam ring 24 is rotatably fitted. Threaded portion 23 is formed on the inner peripheral surface of the front end portion of cam ring 24, and focusing ring 26 is screwed thereto. By rotating focusing ring 26, cam ring 24 can be moved axially for fine focus adjustment. Retaining ring 27 is fitted on the outer circumferential surface of the front end portion of fixed frame 22, so as to abut against focusing ring 26, and cylindrically-shaped movable frame 28 is inserted in fixed frame 22 to be movable in the axial direction of frame 22. Three roller pins 29 (only one of which is shown in FIG. 7) are attached to the outer periphery of movable frame 28, and each penetrates straight groove 22a formed in fixed frame 22, so as to fit in first cam groove 24a formed in cam ring 24. Straight groove 22a extends along the axis of fixed frame 22, while cam groove 24a is a spiral. Thus, as cam ring 24 is rotated, movable frame 28 moves straight in its axial direction. Shade cloth 30 is attached to the outer peripheral surface of the front end portion of fixed frame 22, so as to be in sliding contact with the inner peripheral surface of cam ring 24, and serves to prevent external light from entering the gap between frame 22 and ring 24.

First, second, and third lens assemblies 31, 32, and 33, which constitute the photographic optical system, are arranged within movable frame 28. More specifically, first lens assembly 31 is supported within frame 28 by means of first-assembly frame 34, which is screwed to the front end portion of frame 28. Cylindrical second-assembly frame 36 is fitted in the intermediate portion of frame 28 to be movable in the axial direction of frame 28. Three roller pins 37 (only one of which is shown in FIG. 7) protrude from frame 36 and each penetrates straight groove 38 formed in frame 28, and straight groove 22a formed in fixed frame 22, so as to fit in spiral second cam groove 24b formed in cam ring 24. Thus, as cam ring 24 is rotated, second-assembly frame 36 moves in its axial direction, inside movable frame 28. A plurality of focusing guide shafts 40 (only one of which is shown in FIG. 7). which extend parallel to the axis of movable frame 28, are fixed to frame 36. Front and rear retaining frames 42 and 44, which hold second lens assembly 32, are supported by shafts 40 to be movable in the axial direction of movable frame 28. Focusing spring 45 is wound around each guide shaft 40 and urges retaining frames 42 and 44 rearward, i.e., to the right in FIG. 7. Thus, a pin 46, which protrudes from rear retaining frame 44, is pressed against a cam surface of ring-shaped focusing cam 47. When cam 47 is rotated by means of drive means (not shown), retaining frames 42 and 44 are moved forward, against the urging force of springs 45, by cam 47, whereby the photographic optical system is focused. Shutter blades 48, which double as a diaphragm, are situated between frames 42 and 44.

Third-assembly frame 50 is fitted in the proximal end portion of movable frame 28 to be movable in the axial direction thereof. Three roller pins 52 (only one of which is shown in FIG. 7) protrude from frame 50, and each penetrates straight groove 52 formed in movable frame 28, and straight groove 22a formed in fixed frame 22, so as to fit in spiral third cam groove 24c formed in cam ring 24. Thus, as cam ring 24 is rotated, thirdassembly frame 50 moves in its axial direction, inside frame 28. Retaining frame 54, which holds third lens assembly 33, is fixedly fitted in frame 50. A focus shift caused by zooming the photographic optical system can be corrected by adjusting the relative positions of frames 50 and 54 by means of a conventional mechanism (not shown).

Lens barrel 12 constructed thus is fixed to body 10 by screwing flange 22b at the proximal end of fixed frame 22 to body 10, as is shown in FIG. 3, and control board 21 is fixed to the outer circumferential surface of the proximal end portion of cam ring 24, so as to be in contact with terminals 25, which are fixed to frame 22. In response to a signal transmitted through terminals 25, the rotational position of cam ring 24, that is, the zooming position of the photographic optical system, is controlled.

As is shown in FIGS. 3, 7, 8, 9 and 10, arcuate interlocking plate 56 is fixed to the outer circumferential surface of cam ring 24 by means of screws. Gear portion 57, which extends along an arc of a circle concentric with ring 24, is formed on the outer surface of plate 56. Each end face of interlocking plate 56 extends at an angle to the axis of cam ring 24, thus forming cam surfaces 55a and 55b, respectively. Surfaces 55a and 55b change their configuration along the axis of ring 24, i.e., the optical axis of the photographic optical system, thus constituting a first cam portion of the present invention. Cam groove 53, which constitutes a second cam portion of the invention, is formed on interlocking plate 56 so as to extend at an angle to the axis of cam ring 24. Moreover, cam groove 73, which constitutes a third cam portion, is formed on plate 56 so as to extend in the circumferential direction thereof.

Figure 8:
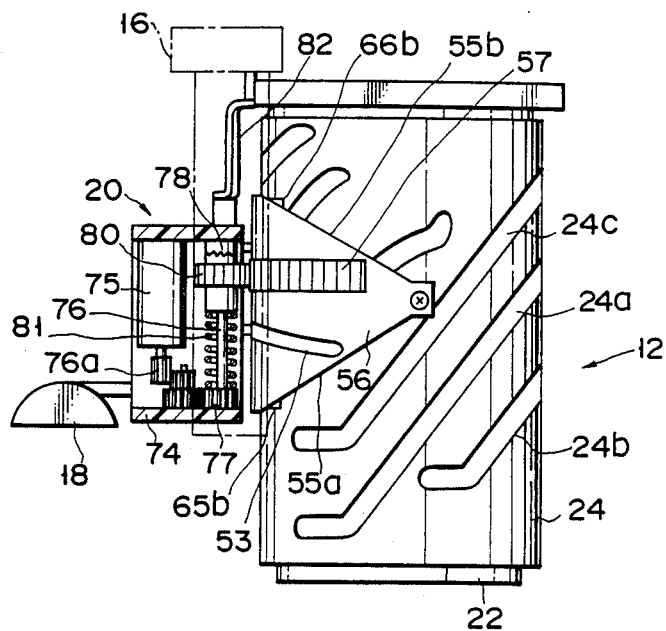

Cam ring 24 is arranged to rotate by means of a driving force transmitted from drive mechanism 20 through gear portion 57. As is shown in FIGS. 3 and 8, mechanism 20 includes support frame 74 attached to grip section 14 of the camera. Motor 75, serving as a drive source, is fixed to frame 74, and drive shaft 76, which extends parallel to the rotating shaft of motor 75, is mounted rotatably on frame 74. Driven gear 77 is fixed to one end of shaft 76, while clutch gear 78 is fixed to the other end. Gear 77 engages gear 76a, which is fixed to the shaft of motor 75, through a gear train mounted on frame 74. Drive gear 80 is mounted on the intermediate portion of drive shaft 76, for rotation and movement in the axial direction of the drive shaft, and is urged to engage clutch gear 78 by clutch spring 81 which is located around shaft 76. Thus, when motor 75 is driven, drive gear 80 is rotated through the medium of gear 76a, gear train, gear 77, drive shaft 76, and clutch gear 78. When subjected a load exceeding a predetermined value, gear 80 is moved away from gear 78, against the urging force of spring 81, whereupon, the driving force ceases to be transmitted to drive gear 80.

Drive mechanism 20 is mounted on grip section 14 so that drive shaft 76 is situated parallel to the optical axis of the photographic optical system, and drive gear 80 is in mesh with gear portion 57 of interlocking plate 56, which is fixed to cam ring 24. Thus, when motor 75 is driven, its driving force is transmitted to plate 56 through gear 80 and gear portion 57, so that ring 24 is rotated in combination with the plate 56.

As cam ring 24 is rotated in this manner, the photographic optical system is moved, in association therewith, between a wide-mode position (FIG. 13A), a tele-mode position (FIG. 13B), and a macro-mode position (FIG. 13C). When the operation mode shifts from wide mode to tele-mode, first, second, and third lens assemblies 31, 32, and 33 are moved forward, while when it shifts from tele-mode to macro-mode, the first and second lens assemblies are held in a stop state, and the third lens assembly moved rearward. In FIGS. 7 and 13A to 13C, numeral 43 designates the surface of a film.

As is shown in FIG. 3, viewfinder mechanism 16 is provided with frame body 58 for supporting the viewfinder optical system. Body 58 includes housing 58a with a substantially rectangular cylindrical shape and support frame 58b fixed to the proximal end thereof. Poly-prism 59, shown in FIG. 10, and eyepiece lens 60 are housed in frame 58b, thereby constituting a loupe optical system.

First, second, and third lens assemblies 61, 62, and 63 of the viewfinder optical system are contained in housing 58a, first lens assembly 16a or an objective lens being retained by first frame 64, which is fixed to the distal end of housing 58a, with second and third lens assemblies 62 and 63 being retained by second and third frames 65 and 66, respectively, which are arranged within housing 58a, for movement along the optical axis of the lenses. Fourth frame 67, which is fixed between the proximal end of housing 58a and support frame 58b, serves to hold planar cover glass 68, which faces incident surface 59a of poly-prism 59, with view frame 69 being positioned therebetween.

Frames 64, 65, 66, and 67 have arm portions 64a, 65a, 66a, and 67a, respectively, which project sideways from housing 58a. A through hole is formed each arm portion, along the optical axis of the viewfinder optical system, and through which guide shaft 70 is passed. The distal end of shaft 70 is fixed in place in the through hole formed in arm portion 64a, while the proximal end portion of the shaft is fixed to arm portion 67a, and fits into a hole formed in support frame 58b. In this way, shaft 70 guides the movement of second and third frames 65 and 66. View frame 69 is supported by housing 58b to be finely movable in its diagonal direction. Tension springs 71 and 72 are stretched between first and second frames 64 and 66 and between second frame 65 and support frame 58b, respectively. In this arrangement, second and third frames 65 and 66 are urged to approach each other by springs 71 and 72. Guide projections 65b and 66b are formed on arm portions 65a and 66a of second and third frames 65 and 66, respectively.

The self-timer display 81 doubles an luminescent portion of the AF optical system (not shown), for emitting an auxiliary light beam.

As is shown in Figs. 3 and 8, viewfinder mechanism 16 constructed in this manner is situated beside lens barrel 12 of the camera, and incorporated in grip section 14 so that the optical axis of the viewfinder optical system is parallel to that of the photographic optical system. In addition, mechanism 16 is located so that interlocking plate 56, which is fixed to the outer peripheral surface of cam ring 24, is situated between guide projections 65b and 66b protruding from frames 65 and 66, respectively. Arranged thus, projections 65b and 66b are pressed against cam surfaces 55a and 55b of plate 56 by the urging forces of springs 71 and 72, respectively, and as cam ring 24 rotates, move along surfaces 55a and 55b, respectively, so that second and third frames 65 and 66 are moved along the optical axis, thereby changing the magnification of the viewfinder optical system. In this way, when cam ring 24 is rotated, second and third lens assemblies 62 and 63 of the viewfinder optical system are moved between a wide-mode position (FIG. 14A), a tele-mode position (FIG. 14B), and a macro-mode position (FIG. 14C), in synchronism with the photographic optical system.

An image picked up by first to third lens assemblies 61, 62, and 63 is transmitted through cover glass 68, thereby forming an inverted real image on an image forming surface which is situated between view frame 69 and incident surface 59a of poly-prism 59. This real image is again inverted, and enlarged by the loupe optical system having poly-prism 59 and eyepiece lens 60, so as to be observed as an upright image.

Figure 9:
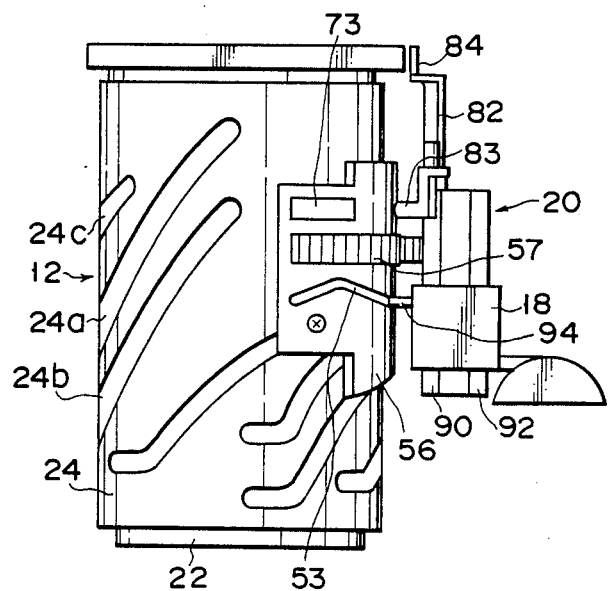
Figure 10:
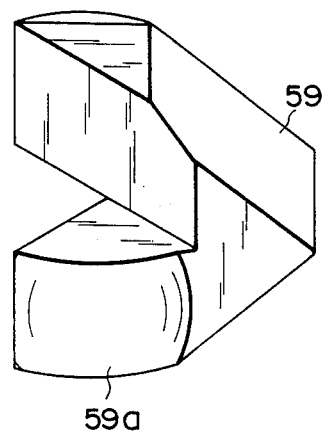
Figure 11:
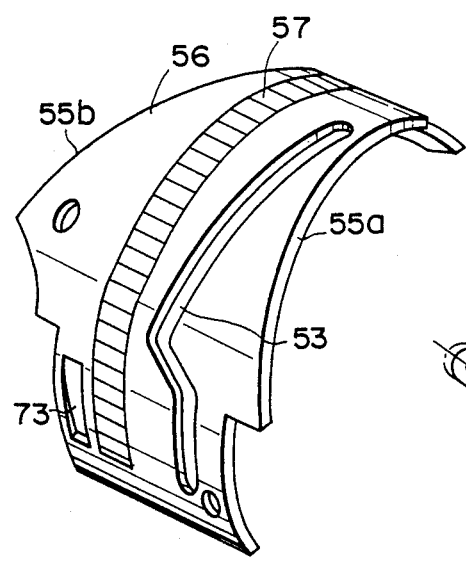
Figure 12:
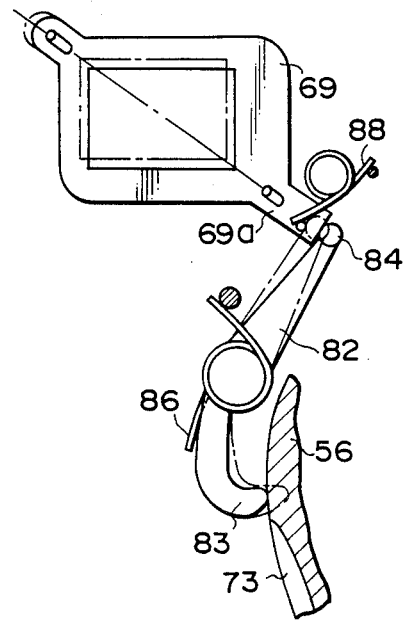

As shown in Figs. 3, 9 and 12, correction arm 82 is mounted on support frame 74 of drive mechanism 20 to be rotatable around an axis parallel to the optical axis of the photographic optical system. Arm 82 is used to correct the parallax of the viewfinder optical system relative to the photographic optical system. Engaging hook 83 and pressure pin 84 are formed at the lower and upper ends of arm 82, respectively. Arm 82 is urged to rotate in the counterclockwise direction of FIG. 12 by torsion spring 86. Thus, hook 83 is pressed against the outer peripheral surface of interlocking plate 56, while pin 84 is pressed against arm portion 69a of view frame 69 of viewfinder mechanism 16. Arm portion 69a is urged toward pin 84 by torsion spring 88. Thus, when plate 56 is in a position for the tele-mode or wide mode of the photograghic optical system, view frame 69 is held in the position indicated by full line in FIG. 12 by means of spring 88. When interlocking plate 56 is rotated to a position for the macro-mode, engaging hook 83 of correction arm 82 faces cam groove 73 on plate 56. Since the urging force of torsion spring 86 is greater than that of torsion spring 88, arm 82 then rotates in the counterclockwise direction, so that engaging hook 83 falls into groove 73. Since view frame 69 is finely movable in its diagonal direction, as mentioned before, it is pressed by pressure pin 84 of arm 82 to be moved to a correction position indicated by dashed line in FIG. 12. Thereupon, the macro-mode parallax of the viewfinder optical system, relative to the photographic optical system, is corrected.

As is shown in Figs. 3 and 9, moreover, a pair of guide rails 90 and 92 are formed on support frame 74 of drive mechanism 20 and extend parallel to the optical axis of the photographic optical system. Strobe mechanism 18 is fitted on rails 90 and 92 to be movable along the same. Mechanism 18 has guide projection 94 which, projecting toward cam ring 24, is fitted in cam groove 53 on interlocking plate 56. As ring 24 rotates, therefore, projection 94 moves along groove 53, so that strobe mechanism 18 is moved along the optical axis of the photographic optical system.

According to the camera constructed in this manner, the photographic optical system is zoomed by rocking cam ring 24 by means of drive mechanism 20 which is located beside body tube 12. Also, viewfinder mechanism 16 is situated beside the body tube, and the viewfinder optical system is zoomed by means of cam surfaces 55a and 55b of interlocking plate 56 which, fixed to the outer peripheral surface of cam ring 24, rocks in one with the ring. Likewise, strobe mechanism 18 is situated beside body tube 12, and is zoomed by means of cam groove 53 on plate 56.

Accordingly, viewfinder mechanism 16 and strobe mechanism 20 can be zoomed by means of a single motor for the drive of the photographic optical system. Thus, the number of components of the camera can be reduced, so that the camera can be simplified in construction and reduced in size. Since mechanisms 16 and 20 can be zoomed directly by means of interlocking plate 56 which is fixed to cam ring 24, moreover, there is no need of any other cam members for this purpose. Thus, the number of components can be further reduced. Furthermore, these two mechanisms can be zoomed accurately in synchronism with the rotation of the cam ring, that is, the zooming of the photographic optical system. Accordingly, there is no need of any adjusting means for synchronizing the operations of viewfinder mechanism 16 and strobe mechanism 18 with the operation of the photographic optical system. In consequence, the camera can be further simplified in construction, and is improved in reliability.

According to the embodiment described above, furthermore, the parallax of the viewfinder optical system is corrected by utilizing cam groove 73 on interlocking plate 56. Therefore, the correction can be performed accurately in synchronism with the zooming of the photographic optical system.

Thus, according to the this embodiment, the viewfinder optical system and the strobe mechanism can be moved accurately in synchronism with the zooming of the photographic optical system with use of a simple arrangement, and a high-reliability compact camera can be provided.

It is to be understood that the present invention is not limited to the embodiment described above, and that various changes and modifications may be effected therein by one skilled in the art without departing from the scope or spirit of the invention.

For example, the first cam portion for zooming the viewfinder optical system is not limited to cam surfaces 55a and 55b of interlocking plate 56, and may have a cam groove on the interlocking plate. The constructions of the photographic optical system and the viewfinder optical system and the range of zooming may be modified or changed as required.

Figure 15:
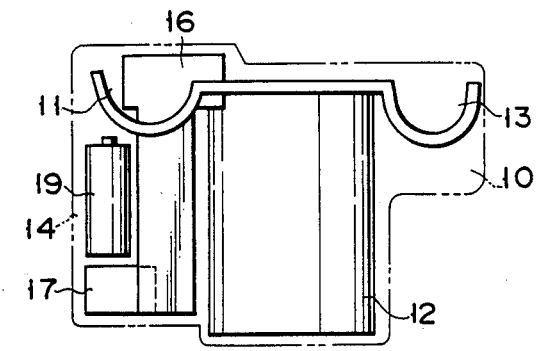
FIGS. 15, 16 and 17 are, respectively, a plan view, a side view, and a front view, showing a modification of the arrangement of the components making up the camera.
Figures 16, 17:
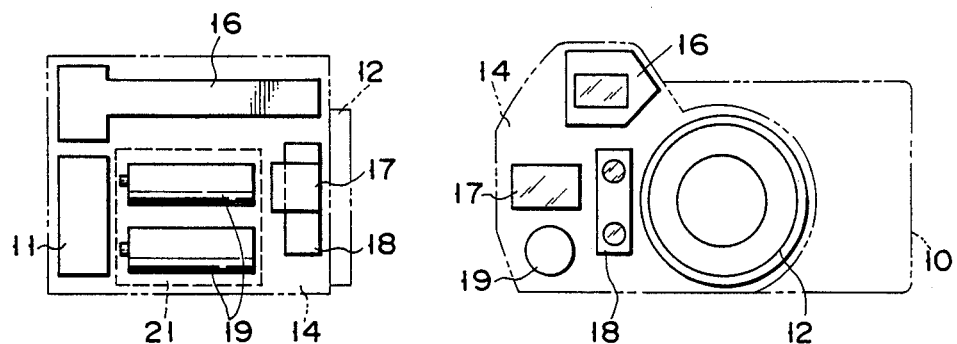

Further, the individual components inside grip section 14 may be arranged as shown in FIGS. 15 to 17. According to this embodiment, viewfinder mechanism 16 is disposed inside the upper portion of grip section 14, and AF optical system 17 and strobe mechanism 18 are arranged horizontally under the viewfinder mechanism. Battery compartment 21 is located between strobe mechanism 18 and film compartment 11.

This alternative embodiment provides the same function and effect of the foregoing embodiment.

What is claimed is:

1. A camera, comprising:
    a photographic optical system movable along an optical axis;
    a cam ring rotatable about the optical axis of the photographic optical system, for moving the photographic optical system along the optical axis thereof to change the focal length of the photographic optical system by rotation, said cam ring including a cylindrical body, and an interlocking member fixed to the outer peripheral surface of the body and having an engaging portion;
    drive means engaged with said engaging portion of the interlocking member, for rotating the cam ring;
    a viewfinder optical system arranged outside of the cam ring, in relation to the radial direction thereof, and having an optical axis parallel to that of the photographic optical system;
    a strobe mechanism arranged outside of the cam ring, in relation to the radial direction thereof, for movement parallel to the optical axis of the photographic optical system;

first cam means formed on the interlocking member, for moving the viewfinder optical system along the optical axis thereof, in association with the rotation of the cam ring, said first cam means having a working surface engaging the viewfinder optical system and changing its configuration in the direction of the optical axis of the photographic optical system; and second cam means formed on the interlocking member, for moving the strobe mechanism in a direction parallel to the optical axis of the photographic optical system, in association with the rotation of the cam ring, said second cam means having a working surface engaging the strobe mechanism and changing its configuration in the direction of the optical axis of the photographic optical system.

2. A camera according to claim 1, wherein said interlocking member has an end face constituting at least one of the first and second cam means.

3. A camera according to claim 1, wherein said viewfinder optical system is provided with a plurality of lens assemblies including a pair of lens assemblies movable along the optical axis thereof, and said interlocking member has a pair of guide surfaces extending at an angle to the optical axis of the photographic optical system and constituting the first cam means, said guide surfaces individually engaging the movable lens assemblies, said viewfinder optical system including urging means for urging the pair of movable lens assemblies toward the guide surfaces corresponding thereto, so that said lens assemblies move following the guide surfaces as the cam ring rotates.

4. A camera according to claim 4, wherein said interlocking member has a cam groove extending at an angle to the optical axis of the photographic optical system and constituting the second cam means, and said strobe mechanism has a guide projection engaging the cam groove to move along the cam groove as the cam ring rotates.

5. A camera according to claim 1, wherein said engaging portion includes a gear portion extending in the form of an arc of a circle around the optical axis of the photographic optical system, and said drive means includes a motor and a gear train for transmitting the rotatory force of the motor to the gear portion.

6. A camera according to claim 1, wherein said viewfinder optical system includes a view frame movable in a direction perpendicular to the optical axis thereof, and which further comprises a correction mechanism for moving the view frame in association with the rotation of the cam ring, to correct parallax between the photographic optical system and the viewfinder optical system.

7. A camera according to claim 6, wherein said correction mechanism includes a rotatable correction lever having a pair of end portions, said view frame engaging one end of the correction lever, and third cam means for engaging the other end of the correction lever to rotate the correction lever in association with the rotation of the cam ring.

8. A camera according to claim 1, which further comprises a camera body having a front face, a lens barrel protruding forward from the front face of the camera body and containing the photographic optical system, and a grip section protruding parallel to the lens barrel, from the front face of the camera body, and laterally adjoining the lens barrel, and wherein said cam ring is fitted on the outer peripheral surface of the lens barrel so as to be rotatable thereabout and said photographic optical system, said drive means, and said strobe mechanism are housed within the grip section.

9. A camera comprising:

a camera body having a front face;

a lens barrel protruding forward from the front face of the camera body and containing a photographic optical system;

a grip section protruding substantially parallel to the axis of the lens barrel, from the front face of the camera body, and laterally adjoining the lens barrel, said grip section having a front end face situated substantially at right angles to the axis of the lens barrel;

a viewfinder mechanism including an optical axis extending parallel to the axis of the lens barrel and an objective lens, and housed within the grip section;

an autofocus optical system including an objective lens and arranged underneath the viewfinder mechanism, within the grip section;

a strobe mechanism including a flash window and arranged in the vicinity of the autofocus optical system, within the grip section; and a battery compartment arranged in the vicinity of the viewfinder mechanism, for containing a battery, within the grip section;

said respective objective lenses of the viewfinder mechanism and the autofocus optical system and said flash window of the strobe mechanism being provided at the front end face of the grip section.

10. A camera according to claim 9, wherein said grip section constitutes a horizontal grip designed to be held by fingers placed in a row parallel to the optical axis of the lens barrel.

11. A camera according to claim 9, wherein said viewfinder mechanism includes a viewfinder optical system having an optical axis extending parallel to the axis of the lens barrel.

12. A camera according to claim 9, wherein said camera body has a film compartment therein for containing a film, and said viewfinder mechanism is situated above the film compartment.

13. A camera, comprising:

a photographic optical system movable along an optical axis;

a cam ring rotatable about the optical axis of the photographic optical system, for moving the photographic optical system along the optical axis thereof to change the focal length of the photographic optical system by rotation, said cam ring including a cylindrical body, and an interlocking member fixed to the outer peripheral surface of the body and having a gear portion extending in the form of an arc of a circle coaxial with the optical axis of the photographic optical system;

drive means engaged with said gear portion, for rotating the cam ring;

a viewfinder optical system having a optical axis parallel to that of the photographic optical system and a movable part arranged outside of the cam ring, in relation to the radial direction thereof, and being movable along the optical axis of the viewfinder optical system so as to change a magnification thereof; and cam means provided on the interlocking member, for moving the movable part of the viewfinder optical system along the optical axis thereof, in association with the rotation of the cam ring, the cam means having a working surface engaging the movable part and changing its configuration in the direction of the optical axis of the photographic optical system.

14. A camera, comprising:

a photographic optical system movable along an optical axis;

a cam ring rotatable within a predetermined angular range about the optical axis of the photographic optical system, for moving the photographic optical system along the optical axis thereof to change the focal length of the photographic optical system by rotation;

drive means for rotating the cam ring;

a viewfinder optical system having an optical axis parallel to that of the photographic optical system, a movable part arranged outside of the cam ring, in relation to the radial direction thereof, and being movable along the optical axis of the viewfinder optical system so as to change a magnification thereof, and a view frame movable in a direction perpendicular to the optical axis of the viewfinder optical system;

cam means provided at the cam ring, for moving the movable part of the viewfinder optical system along the optical axis thereof, in association with the rotation of the cam ring; and correction means having a cam portion provided at the cam ring, for moving the view frame so as to correct parallax between the photographic optical system and the viewfinder optical system when said cam ring is rotated to one end of said angular range.

* * * * *